(No Model.)
J. E. NEWCOMB.
CAR BRAKE.
No. 301,386. Patented July 1, 1884.
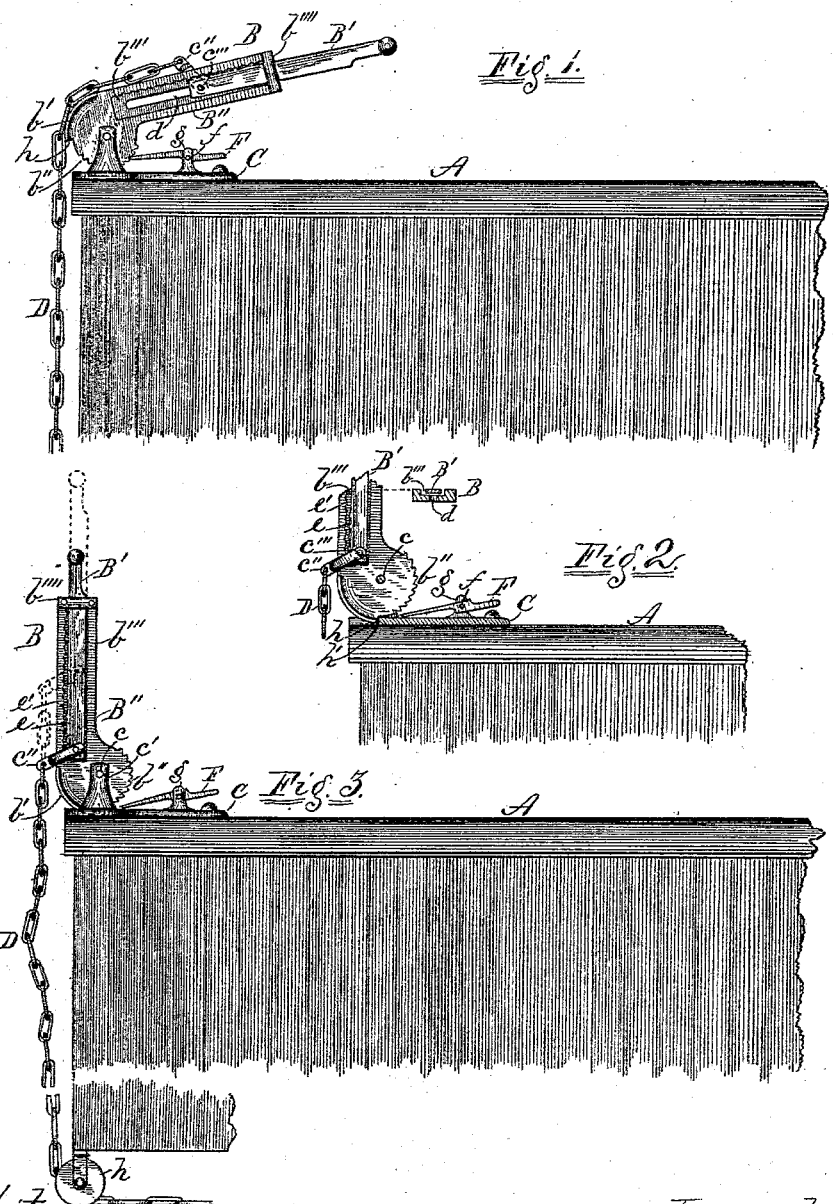
Witnesses:
P. R. Richards
George C. Graham
Inventor:
James E. Newcomb,
By W. B. Richards,
his Atty.

UNITED STATES PATENT OFFICE.

JAMES E. NEWCOMB, OF ROCK ISLAND, ILLINOIS, ASSIGNOR OF ONE-HALF TO FRANCIS M. DEVORE, OF KNOXVILLE, IOWA.

CAR-BRAKE.

SPECIFICATION forming part of Letters Patent No. 301,386, dated July 1, 1884.

Application filed April 25, 1884. (No model.)

*To all whom it may concern:*

Be it known that I, JAMES E. NEWCOMB, a citizen of the United States, residing at Rock Island, in the county of Rock Island and State of Illinois, have invented certain new and useful Improvements in Car-Brake-Operating Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
This invention relates to improvements in car-brake-operating mechanism; and it consists, in its principal feature, in the use of an extensible lever mounted on top of the car and connected with a chain which extends to the ordinary brake-levers, the connection of the chain to the lever being such that the extensible feature thereof may be utilized to take up the slack of the chain before turning the lever to set the brakes.
The invention further consists in constructions and combinations hereinafter fully described, and set forth in the claims hereto annexed.

In the accompanying drawings, Figure 1 is a side elevation of my invention, shown mounted on a railway-car, a portion of which is also shown. Fig. 2 is partly a side and partly a sectional elevation. Fig. 3 is a side elevation.
Referring to the parts by letters, the same letter indicating the same part in the different figures, A represents a portion of one end of a railway-car.

B is a lever pivoted at *c* between standards *c'*, which project upwardly from a base-plate, C. The lower end of the lever B is enlarged, as shown, and is smooth at *b'* on one side and cut into ratchet-teeth *b''* on its other side. The part B' of the lever B slides in a groove, *b'''*, in its part B'', and is held in place therein by a strap, *b''''*, at one end of the part B'', and by a stirrup, *c''*, which is forked at one end, and strides one side of the part B'', and is bolted to the part B' by a pivot-bolt, *c'''*. The outer end of the stirrup *c''* is connected with one end of the chain D, which passes thence over the part *b'* of the lever B, extends to and is connected at its other end to the ordinary brake-levers. (Not shown.) The bolt *c'''* extends through a slot, *d*, which is lengthwise of the part B'', and thus permits of moving the part B' lengthwise of the part B''. The part B' is not as wide as and fits loosely in the groove *b'''*, so that it may slide lengthwise in said groove when the teeth *e* on one of its sides are not engaged with the teeth *e'* in one wall of the groove *b'''*.

F is a pawl pivoted at *f* in standards *g*, which project from the base C. By pressing on the outer end of the pawl F its other end will be forced upward to engage the ratchet-teeth *b''*. The lower end of the lever B has a shoulder or projection, *h*, which engages with the rear wall of a slot, *h'*, in the base C, as shown at Fig. 2, when the lever is turned into a vertical position, as shown at Figs. 2 and 3, and thus holds the lever B in its normal position. While the lever B is in the position last described the chain D will from various causes become slack, as shown at Fig. 3, and with this slack in it, merely turning the lever rearward would not apply the brakes, as it would but little if any more than take up the slack. By sliding the part B' outward on the part B'', as shown by dotted lines at Fig. 3, the slack in the chain D may be all taken up, and then swinging the lever B will surely operate the brakes. Extending the lever B, as last described, will also give increased leverage in applying the brakes. When the lever B is turned to apply the brakes, the operator, by placing his foot on the outer end of the pawl F, may force its other end into contact with the ratchet-teeth *b''*, to hold the lever, and thereby hold the brakes until released by releasing said pawl, which will permit the lever B to return to its normal position (shown at Figs. 2 and 3) by the tension and weight of the chain D.

To prevent friction where the chain D passes around the lower corner of the car, I use a pulley or roller, *h*, over which the chain passes.

My lever for setting the brakes can be operated quicker, is safer, cheaper, and easier operated than the ordinary wheel-brakes, serves as an indicator to show by its position whether or not the brakes are set, and by its extensible feature provides for taking up the slack of the chain and giving increased length of lever.

Having thus described my invention, what I claim as new, and desire to secure by Letters Patent, is—

1. In a car-brake-operating mechanism, in combination, the chain D and extensible lever B, substantially as and for the purpose specified.

2. In a car-brake-operating mechanism, in combination, the chain D, extensible lever B, and pawl F, substantially as and for the purpose specified.

3. In a car-brake-operating mechanism, in combination, chain D, lever B, formed in two parts, B' B", the part B", having ratchet-teeth b", stirrup c", and pawl F, substantially as and for the purpose specified.

4. In combination, the chain D, the lever B, made in two parts, a part, B", having a groove, b''', slot d, and ratchet-teeth b", and a part, B', stirrup c", and pawl F, substantially as and for the purpose specified.

In testimony whereof I affix my signature in presence of two witnesses.

JAMES E. NEWCOMB.

Witnesses:
A. B. MILLER,
N. S. SWENSON.